Nov. 6, 1951  G. G. McNAMARA, JR  2,573,921
SCRAPER BLADE
Filed Aug. 17, 1946
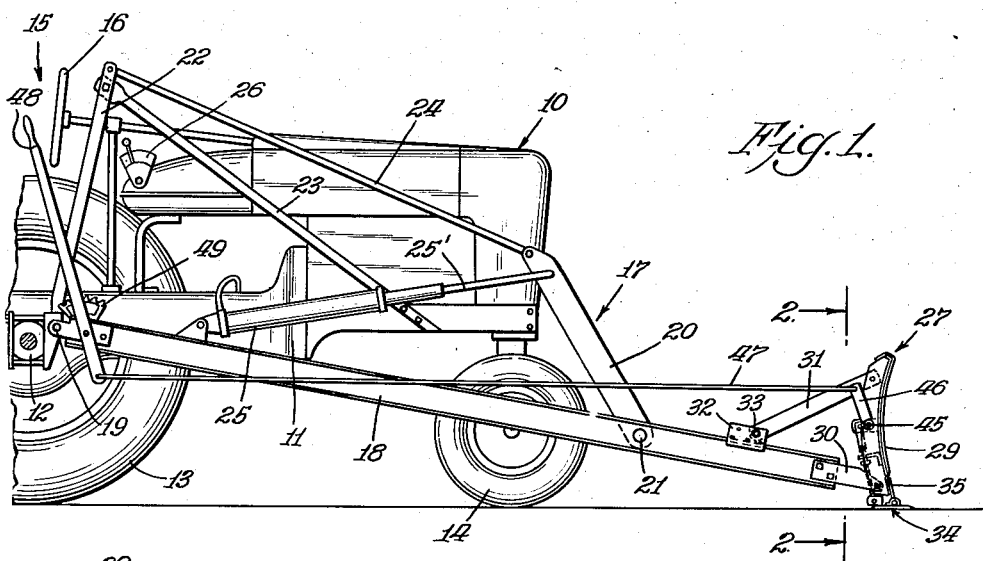
Fig.1.
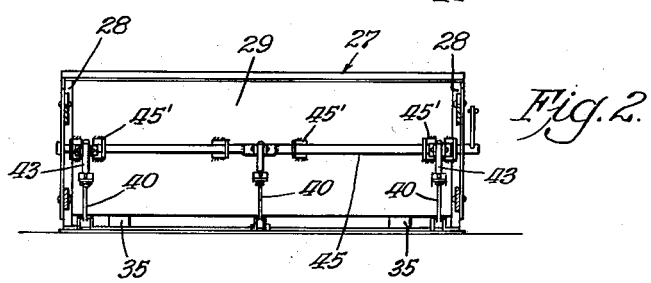
Fig.2.
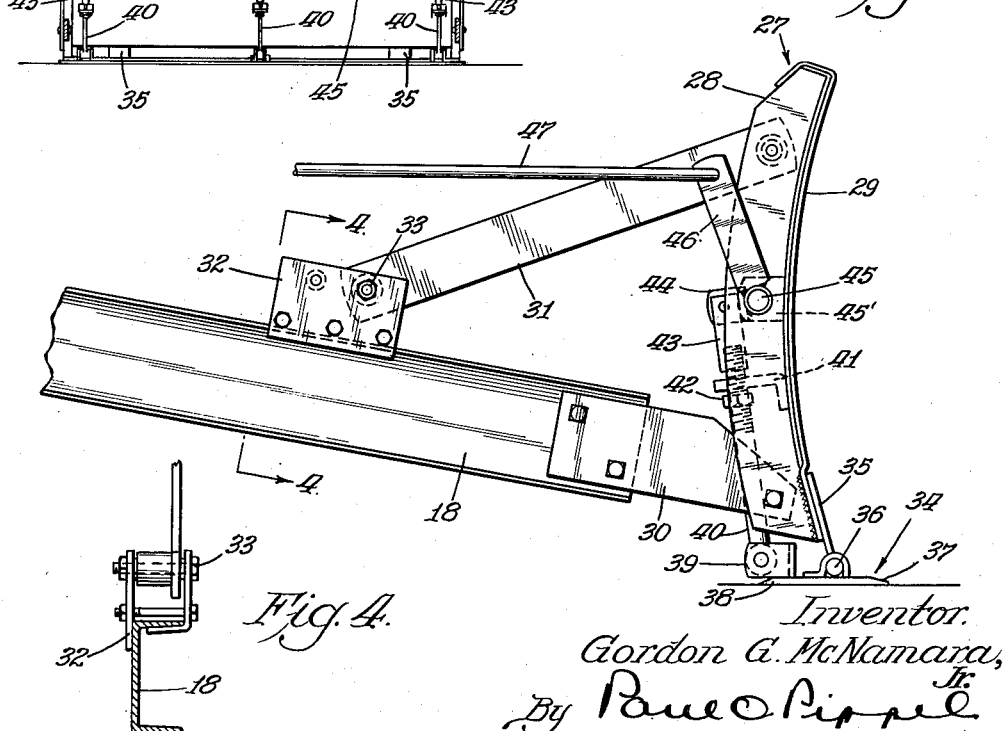
Fig.3.
Fig.4.
Inventor.
Gordon G. McNamara, Jr.
By Paul O. Pippel
Atty.

Patented Nov. 6, 1951

2,573,921

UNITED STATES PATENT OFFICE 2,573,921

SCRAPER BLADE

Gordon G. McNamara, Jr., Chicago, Ill., assignor to International Harvester Company, a corporation of New Jersey Application August 17, 1946, Serial No. 691,203

4 Claims. (Cl. 37—143)

This invention relates to an improved construction in earth moving implements, and more particularly to an earth-working implement of the grading or bulldozer type.

More specifically, it relates to a bulldozer type of implement having an improved construction for controlling the ground working depth of the scraper blade.

A prime object of this invention is to provide a scraper for a grader type of implement, said scraper having an adjustable cutting and gauge blade connected thereto.

Another object is to provide an improved scraper having a cutting blade connected to the lower portion thereof for regulating and adjusting the ground working depth of said scraper.

Another object is to provide a cutting and gauge blade hingedly connected to a grading scraper, said blade having cutting portions extending longitudinally forwardly and rearwardly underneath the scraper.

A still further object is to provide a grader-type of scraper blade adapted to be transversely mounted on the forward end of a tractor, said scraper blade including a transversely extending cutting and gauging blade connected to the lower portion of said scraper and being angularly adjustable from the tractor to vary and gauge the cutting depth of the scraper.

Other objects of the invention will become hereinafter more fully apparent from an examination of the following specification when read in conjunction with the drawing wherein:

Fig. 1 is a side elevational view of a tractor having a grading implement connected thereto;

Fig. 2 is a sectional view taken along the line 2—2 of Fig. 1, showing a portion of the adjusting means for angularly adjusting the cutting and gauging blade of a scraper;

Fig. 3 is an enlarged side elevational view showing a scraper blade having a cutting and gauging blade connected thereto; and Fig. 4 is a detail sectional view taken along the line 4—4 of Fig. 3.

As shown in Fig. 1, a tractor is generally indicated by the reference character 10. The tractor 10 includes a longitudinal body structure 11 which is mounted on a rear axle structure 12 carried on rear ground wheels 13. The forward portion of the longitudinal body is carried on front ground wheels 14. An operator's station 15 is located at the rear of the longitudinal body 11 and includes a steering wheel 16 of conventional construction for controlling the front ground wheels 14.

A ground working implement generally designated by the reference character 17 is supported on the longitudinal body 11 of the tractor 10. The ground working implement 17 includes a pair of longitudinally extending channel members 18, only one of which is shown. A lifting yoke 20 is pivotally connected to each of the longitudinally extending members 18 by means of a pin 21. A support 22 is rigidly connected at each side of the tractor by means of a brace 23 securely mounted on the longitudinal body 11. A link 24 substantially parallel to each channel member 18, is pivotally connected at each of its ends to the support 22 and to the lifting yoke 20. A cylinder and piston construction 25 is connected at each side of the tractor to each longitudinally extending channel 18. A piston rod 25' is connected to each of the lifting yokes 20. A touch control mechanism, comprising a quadrant 26, is mounted near the operator's station 15 and is adapted to control, in a conventional manner, the lifting movement of the cylinder and piston structure 25.

A grader or dozer blade, generally indicated by the reference character 27, is mounted on the frame 18 at the forward portion thereof. The blade 27 is transversely carried on the channel members 18 by means of two or more angle brackets 28 which are securely fastened to a transversely extending and vertically concave blade 29. A gusset plate 30 is suitably connected to each of the two angle brackets 28 and the channel members 18. A supporting arm 31 is connected at the upper portion of two of the angle brackets 28 and extends rearwardly thereof for connection between the upstanding arms of a U-shaped bracket 32 which is securely connected to each of the channel members 18. A bolt 33 extending through a U-shaped bracket 32 rigidly connects the supporting arms 31 to said brackets 32.

Referring particularly to Figs. 2 and 3, a gauging and cutting blade is generally designated by the reference character 34. The gauging and cutting blade 34 is pivotally connected to the lower side of the dozer blade 27 by means of hinges 35 and hinge pins 36. The blade 34 is transversely coextensive with the dozer blade 27 and includes forwardly and rearwardly extending beveled cutting portions 37 and 38 respectively.

The gauging and cutting blade 34, as shown in Fig. 3, is substantially flat and is normally positioned in a horizontal position with respect to the dozer blade 27. An adjusting means for angularly adjusting the position of the blade 34 includes a plurality of U-shaped members 39 which are securely connected to the rearwardly extending beveled cutting portion 38. A plurality of substantially vertically extending links 40 are each connected to the U-clamps 39, the upper portion of the links 40 being threaded and extending through an angle bracket 41. The angle brackets 41 are laterally spaced, as best shown in Figure 2, and are rigidly secured to the rear surface of the concave blade 29. The links 40 loosely extend through the angle brackets 41 in sliding relation with respect thereto. An adjusting nut 42 is threaded to the links and is positioned below the angle bracket 41. The nut 42 is adapted to engage the bracket 41, thus limiting the vertical movement of the link 40. A sleeve 43 is threaded to the upper portion of each of the links 40 and is in turn connected to lifting arms 44, each of which is rigidly connected to a transverse shaft 45. The transverse shaft 45 is journaled on brackets 45' suitably rigidly connected to the dozer blade 27. A link 47 is pivotally connected to the upstanding arm 46 at its forward portion and is pivotally connected at its rearward end to a detent arm 48 suitably mounted on one of the channel members 18 within reach of the operator's station 15. The detent arm 48 is adjustable about a quadrant 49.

During the operation of the ground implement, the cylinder and piston construction 25 is operable for raising and lowering the scraper blade 27. When it is desired to place the scraper blade into a ground working position, the same is lowered to the ground and the longitudinally extending channel members 18 are free to pivot about the connection 19 since the cylinder and piston structure 25 is now in a non-operating status. The operator pushes the detent arm 48 forward thus causing the gauging and cutting blade 34 to be placed at an angular position limited by the previous adjustment of nut 42, whereby the forwardly extending bevel cutting portion 37 will point downwardly and be in a position to penetrate the ground. The ground working implement is moved forwardly and the dozer blade 27 penetrates the ground to the desired depth and the operator may manually adjust the angularity of the cutting blade to effect any desired penetration. By the angularity of the cutting and gauging blade, the operator may also control the volume of ground that is to be moved at any one time by the dozer blade 27.

When it is desired to remove the dozer blade 27 from its ground penetrating position, the cutting and gauging blade is angularly adjusted so that its forward cutting edge points slightly upwardly with respect to a horizontal plane. Continued forward movement of the tractor thereupon causes the dozer blade to leave the ground. It is readily apparent that simple manual adjustment of the cutting and gauging blade is effective to regulate the depth penetration of the dozer blade and that this can be readily accomplished under the manual control of the operator at his station on the tractor. The inherent difficulties of the conventional type of grader or bulldozer are thereby eliminated in that the depth of cut can be readily controlled and that excessive stress both upon the structure of the dozer and the tractor are eliminated. The depth of cut can be quickly adjusted regardless of the type of soil to be worked. Excessive strain on the operator and the tractor are eliminated. Since it is no longer necessary to back up the tractor and remove the blade from the ground, due to excessive penetration beyond the power capacity of the tractor, the operator can simply adjust his cutting blade, thereby permitting the tractor to maintain its forward motion. The cutting and gauging blade 34 is also provided with the rearwardly extending bevel portion 38, said portion permitting depth adjustment when the tractor is propelled rearwardly. This feature is also especially effective in the digging of ditches or other trenches where forward and rearward digging movement of the dozer blade 27 is necessary.

It is to be understood that modifications in the structure may be made which do not depart from the spirit of the invention, as disclosed, nor the scope thereof as defined in the appended claims.

What is claimed is:

1. An earth moving implement comprising a mobile frame, an earth working element associated with said frame in transverse relation with respect to the direction of movement of said frame, a combined gauging and cutting blade pivotally connected to the lower portion of said earth working element and coextensive therewith, said blade normally being positioned in a horizontal plane and having tapered cutting edges extending forwardly and rearwardly of said earth working element, and means connected to said blade for angularly moving the same with respect to said earth working element.

2. The combination with a tractor having a longitudinal body supported on front and rear ground wheels, of an earth working implement mounted on said tractor, said implement comprising a pair of frame members being pivotally connected at opposite sides of said longitudinal body and extending longitudinally with respect thereto, a substantially vertical scraper blade rigidly connected to said frame members in transverse relation with respect to the direction of travel of said tractor, a gauging and cutting blade pivotally connected to the lower portion of said scraper blade, said gauging and cutting blade having tapered cutting portions extending longitudinally forwardly and rearwardly beneath said scraper blade, and linkage means on said tractor connecting said gauging and cutting blade for angularly adjusting the same with respect to said scraper blade, thereby regulating the ground working depth of said scraper blade.

3. An earth moving implement comprising a mobile frame, an earth working element associated with said frame in transverse relation with respect to the direction of movement of said frame, a combined gauging and cutting blade pivotally connected to the lower portion of said earth working element, said blade normally being positioned in a horizontal plane and having substantially flat guide portions extending forwardly and rearwardly with respect to the pivotal connection of said blade to the earth working element, the pivotal point of connection of said blade with respect to said earth working element being positioned substantially beneath the lower edge of said earth working element whereby the forward guide portion may be freely tilted upwardly and the rearward guide portion may be simultaneously freely tilted downwardly with respect to the normal horizontal plane position of said blade, and means connected to said blade for tiltably moving the same with respect to the earth working element thereby regulating the depth of said earth working element.

4. An earth working implement comprising a mobile frame, an earth working element associated with said frame in transverse relation with respect to the direction of movement of said frame, said earth working element including a dozer blade, a combined gauging and cutting blade pivotally connected to the lower portion of said earth working element, said blade normally being positioned in a horizontal plane and having substantially flat guide portions extending substantially forwardly and rearwardly of said dozer blade, the pivotal point of connection of said gauging and cutting blade with respect to said earth working element being positioned immediately adjacent the lower edge of said dozer blade whereby the forward guide portion may be freely tilted upwardly and the rearward guide portion may be simultaneously freely tilted downwardly with respect to the normal horizontal plane position of said blade, and means connected to said blade for tiltably moving the same with respect to said earth working element, thereby regulating the ground working depth of said earth working element.

GORDON G. McNAMARA, Jr.

REFERENCES CITED

The following references are of record in the file of this patent:

UNITED STATES PATENTS

| Number | Name | Date |
|---|---|---|
| 2,029,122 | Stout, Jr. | Jan. 28, 1936 |
| 2,146,807 | Ferari | Feb. 14, 1939 |
| 2,303,379 | Mork | Dec. 1, 1942 |